United States Patent
Weste et al.

(10) Patent No.: US 6,944,121 B1
(45) Date of Patent: Sep. 13, 2005

(54) WIRELESS COMPUTER NETWORK INCLUDING A MOBILE APPLIANCE CONTAINING A SINGLE CHIP TRANSCEIVER

(75) Inventors: Neil Weste, Castle Hill (AU); Andrew Adams, Stanmore (AU); Philip Ryan, Glebe (AU); John O'Sullivan, Ermington (AU); David J. Skellern, Roseville (AU); Richard Keaney, Annandale (AU)

(73) Assignee: Cisco Systems Wireless Networking (Australia) Pty Limited, North Sydney (AU)

( * ) Notice: Subject to any disclaimer, the term of this patent is extended or adjusted under 35 U.S.C. 154(b) by 860 days.

(21) Appl. No.: 09/877,402

(22) Filed: Jun. 8, 2001

Related U.S. Application Data

(60) Provisional application No. 60/277,370, filed on Mar. 19, 2001, provisional application No. 60/283,609, filed on Apr. 13, 2001.

(51) Int. Cl.[7] .............................................. H04L 12/28
(52) U.S. Cl. .................................... 370/208; 370/338
(58) Field of Search ............................... 370/401, 338, 370/328, 210, 208, 469; 455/84; 375/238; 331/17

(56) References Cited

U.S. PATENT DOCUMENTS

| | | | |
|---|---|---|---|
| 5,282,222 A | 1/1994 | Fattouche et al. ............... 375/1 |
| 5,487,069 A | 1/1996 | O'Sullivan et al. ......... 370/94.3 |
| 5,636,140 A * | 6/1997 | Lee et al. .................... 370/469 |
| 5,923,761 A | 7/1999 | Lodenius ..................... 380/49 |
| 5,953,636 A | 9/1999 | Keate et al. .................. 455/3.2 |
| 6,081,697 A | 6/2000 | Haartsen ..................... 455/109 |
| 6,512,419 B1 * | 1/2003 | Adams et al. ................. 331/17 |
| 6,526,264 B2 * | 2/2003 | Sugar et al. .................. 455/84 |
| 6,647,015 B2 * | 11/2003 | Malkemes et al. .......... 370/401 |
| 6,665,339 B1 * | 12/2003 | Adams et al. .............. 375/238 |

FOREIGN PATENT DOCUMENTS

WO    WO 01/11815    2/2001    ............. H04L 1/00

OTHER PUBLICATIONS

Jacques C. Rudell, J. A. Weldon, J. J. Ou, L. Lin, P Gray, "An Integrated GSM/DECT Receiver: Design Specifications," UCB Electronics Research Laboratory Memorandum Memo #: UCB/ERL M97/82, Apr. 1998.

(Continued)

*Primary Examiner*—Chau Nguyen
*Assistant Examiner*—Albert T. Chou
(74) *Attorney, Agent, or Firm*—Dov Rosenfeld; Inventek

(57) ABSTRACT

A wireless computer data network includes several untethered mobile units that make ad-hoc data connections with an Internet-connected base station using the IEEE-802.11a standard. Each unit includes a radio transceiver fully integrated on a single semiconductor chip. The receiver portion is a double-conversion superheterodyne type, and shares the same intermediate and local oscillator frequencies with a two-stage up-conversion transmitter. Two on-chip synthesizers that each include a voltage-controlled oscillator and phase-locked loop can be operated independently for each conversion stage, or operated in offset mode. External reference frequencies can be injected for voltage-controlled oscillator and phase-locked loop testing, chip characterization, and automatic compensation modeling. Each mobile and base unit can be outfitted with transmit/receive antenna transfer switches, RF-power amplifiers, and low-noise receiver amplifiers to increase operating range.

14 Claims, 3 Drawing Sheets

OTHER PUBLICATIONS

J. C. Rudell, J.J. Ou, R. S. Narayanaswami, G. Chien, J. A. Weldon, L.Lin, K.C. Tsai, L. Tee, K. Khoo, D. Au, T. Robinson, D. Gerna, M. Otsuka, P. R. Gray, "Recent Developments in High Integration Multi-Standard CMOS Transceivers for Personal Communication Systems", Department of Electrical Engineering and Computer Sciences, University of California at Berkeley, 1998.

H. Samavati, H. R. Rategh, T.H. Lee, "A 5-GHz CMOS Wireless LAN Receiver Front End", IEEE Journal of Soild-State Circuits, vol. 35, No. 5, pp. 765-777, May 2000.

J. C. Rudell, J.J. Ou, T. B. Cho, G. Chien, F. Brianti, J. A. Weldon, P. R. Gray, "A 1.9-GHz Wide-Band IF Double Conversion CMOS Receiver for Cordless Telephone Applications," IEEE Journal of Solid-State Circuits, vol. 32, No. 12, pp. 2071-2088, Dec. 1997.

"Atheros 'Rearchitects' the Radio; 'Radio-on-a-Chip' Shatters Wireless LAN Price/Performance Barrier", Press Release, Atheros Communications, Inc., Sunnyvale, CA, Sep. 18, 2000.

"Next-Generation Wireless LAN in Mainstream CMOS Technology", Brochure, Atheros Communications, Inc., Sunnyvale, CA, Sep. 2000.

"Radiata First to Deliver High-Performance, Low-Cost Wireless Networking Solution—Industry's First IEEE-802.11a Chipset Delivers Five Times the Performance of Current Wireless Networking Solutions at Comparable Cost", Press Release, Issued Sep. 15, 2000, Radiata, Inc. San Jose, CA.

"Radiata Technology Enables Chip-Level 'Wireless Engine'", Brochure, Issued Sep. 15, 2000, Radiata, Inc. San Jose, CA.

"CMOS chip sets accelerate shift to 5-Ghz wireless nets", Patrick Mannion, EETimes, Sep. 18, 2000.

* cited by examiner

WIRELESS COMPUTER NETWORK INCLUDING A MOBILE APPLIANCE CONTAINING A SINGLE CHIP TRANSCEIVER

RELATED PATENT APPLICATIONS

This invention claims priority of the following U.S. provisional patent applications:

Ser. No. 60/277,370 entitled SYSTEM USING SINGLE CHIP WIRELESS LAN MODEM AND SINGLE CHIP RADIO TRANSCEIVER AND APPARATI, METHODS, AND SOFTWARE PRODUCTS USED THEREIN OR THEREWITH, filed: Mar. 19, 2001, (the "First Parent application");

Ser. No. 60/283,609 entitled WIRELESS COMMUNICATION SYSTEM, filed: Apr. 13, 2001, (the "Second Parent application").

The First Parent Application and the Second Parent Application are incorporated herein by reference.

BACKGROUND OF THE INVENTION

1. Field of the Invention

The present invention relates to wireless systems, and more particularly to highly integrated semiconductor devices that fully include 5-GHz transceivers suitable for untethered computer data networking.

2. Description of Related Art

John D. O'Sullivan, et al., describe portable computer wireless local area network devices that operate in excess of 10 GHz in U.S. Pat. No. 5,487,069, issued Jan. 23, 1996, (herein "O'Sullivan '069"). One object of such devices is to allow portable computer users to access the enterprise's LAN untethered and from any location in several buildings on a campus. Plug-in connectors are possible in such situations, but they are not very convenient. Unfortunately, prior art wireless systems have been limited to rather modest data rates. Such small bandwidth can be aggravating in modern Internet uses.

Carrier frequencies in the ultra-high frequency (UHF) radio bands and above can naturally carry very high modulation rates, so more data bandwidth is inherently available. But UHF and microwave radio signals are subject to multipath interference that can corrupt communications. O'Sullivan '069 summarizes some of the other problems encountered by prior art systems when trying to operate at 10-GHz and higher.

A method of converting data into symbols that are used to modulate the radio carrier is offered by O'Sullivan '069 to overcome the problems inherent in spread spectrum systems. The use of symbols establishes many parallel sub-channels that each have modulation periods much longer than any multipath delays that might confuse demodulation. Such Patent is incorporated herein by reference. In effect, O'Sullivan '069 describe the basic coded orthogonal frequency division multiplexing (COFDM) called for in the IEEE-802.11a wireless LAN Specification.

Michael Fattouche, et al., describe a method of OFDM wireless communication amongst a number of transceivers, in U.S. Pat. No. 5,282,222, issued Jan. 25, 1994, (herein "Fattouche '222"). They observe that portable uses require that the power demands of the transceivers be kept to a minimum. The use of unlicensed bands is seen as an advantage, but the operating parameters of the transceivers are constrained by law. (E.g., 47 CFR §15.407.) Fattouche '222 describe implementations in which carrier and timing recovery is not needed by carefully choosing certain parameters for differential coding. The IEEE-802.11a Specification does not use differential coding, and quite deliberately includes a preamble transmission so that carrier and timing can be recovered.

The IEEE-802.11a burst transmission begins with a two-part preamble, e.g., a short preamble and a long-preamble. The exact boundary point between the short and long preambles is important to the receiver's subsequent demodulation process, and must be found quickly in an environment where the carrier frequency and code phrase are uncertain. Signal fading, multipath interference, and channel distortion can make signal acquisition less certain in a typical receiver.

The quality of carrier frequency-offset estimation must be such that the relative error between actual and estimated values does not exceed approximately one percent of the frequency spacing between consecutive sub-carriers, e.g., 3.125 KHz at the higher data rate. About one percent is necessary at 54 Mbps maximum rate easing to about ten percent for the lowest 6 Mbps rate for negligible degradation of the data transmission. In order to reach this target precision, frequency offset estimation may be carried out in two successive stages. Coarse and fine estimates may be derived from the processing of the short preamble symbols. The residual frequency error usually remaining after coarse frequency offset correction depends on the signal levels but is about one percent, e.g. ±2 KHz for signals of sufficient strength for demodulation at the maximum 54 Mbps rate. The physical layer convergence procedure (PLCP) preamble field is used for receiver synchronization and comprises ten short symbols and two long symbols. See, IEEE 802.11a-1999, §17.3.3. In common parlance, these are called the "short preamble" and the "long preamble."

Transmitter and receiver frequency offset errors as estimated according to the above description need to be removed in order for a receiver to track the transmitted signal and demodulate it properly. At least two conventional methods exist to remove such offsets. A first feeds back a correction signal to a VCO driving local oscillator to cancel the offsets. A second method accounts for the offsets in subsequent digital signal processing.

Radios-on-a-chip (RoC) are now being promoted by several companies, e.g., Atheros Communications (Sunnyvale, Calif.) which markets its AR5000 chipset. Such put complete 5.15–5.35 GHz transceivers on a chip, and need only few external filters, a transmit/receive switch and a crystal to operate. High power is not easily achievable on a single CMOS chip, so makers like Atheros and Radiata Communications (San Jose, Calif.) produce radio-on-a-chip devices that operate at low signal power-output levels. External transmitter power amplifiers and receiver low-noise amplifiers are then added if needed.

SUMMARY OF THE INVENTION

An object of the present invention is to provide a wireless communication system.

Another object of the present invention is to provide a 5 GHz fully integrated wireless radio transceiver in a single semiconductor device.

A further object of the present invention is to provide a wireless local area network.

Briefly, a wireless computer data network includes several untethered mobile units that made ad-hoc data connections with an Internet-connected base station using the IEEE-802.11a standard. Each unit includes a radio transceiver fully integrated on a single semiconductor chip. The receiver portion is a double-conversion superheterodyne type, and shares the same intermediate and local oscillator frequencies with a two-stage up-conversion transmitter. Two on-chip synthesizers that each include a voltage-controlled oscillator and phase-locked loop can be operated independently for each conversion stage, or operated in offset mode. External reference frequencies can be injected for voltage-controlled oscillator and phase-locked loop testing, chip characterization, and automatic compensation modeling. Each mobile and base unit can be outfitted with transmit/receive antenna transfer switches, RF-power amplifiers, and low-noise receiver amplifiers to increase operating range.

An advantage of the present invention is that a wireless computer data network is provided that suits the IEEE-802.11a standard.

Another advantage of the present invention is that a radio transceiver chip is provided that can be combined with network interface controllers to build a local area network.

A still further advantage of the present invention is that a communication system is provided that is inexpensive to manufacture.

Another advantage of the present invention is that a communication system is provided wherein the ultimate signal-to-noise ratio that can be achieved is not limited by the architecture. This is important in some fading environments where 35 dB+ signal-to-noise ratio is required to accurately demodulate the high data rate modes using 64 QAM. For example, external, low noise VCO's may be used to improve the ultimate S/N. This is in contrast to other architectures which might rely on accurate I-Q balance and suppression of other artifacts such as 1/f noise and dc offsets to achieve high S/N. Obtaining 35 dB+ S/N with such architectures is difficult. Another example is the use of the receiver IF filter. The number of poles used in this filter can be adjusted according to the application and the operating environment.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 4A shows an embodiment with a receiver having I and Q output while FIG. 4B shows a single sideband (SSB) embodiment with a receiver having a single output.

DETAILED DESCRIPTION OF THE INVENTION

Figure 1:
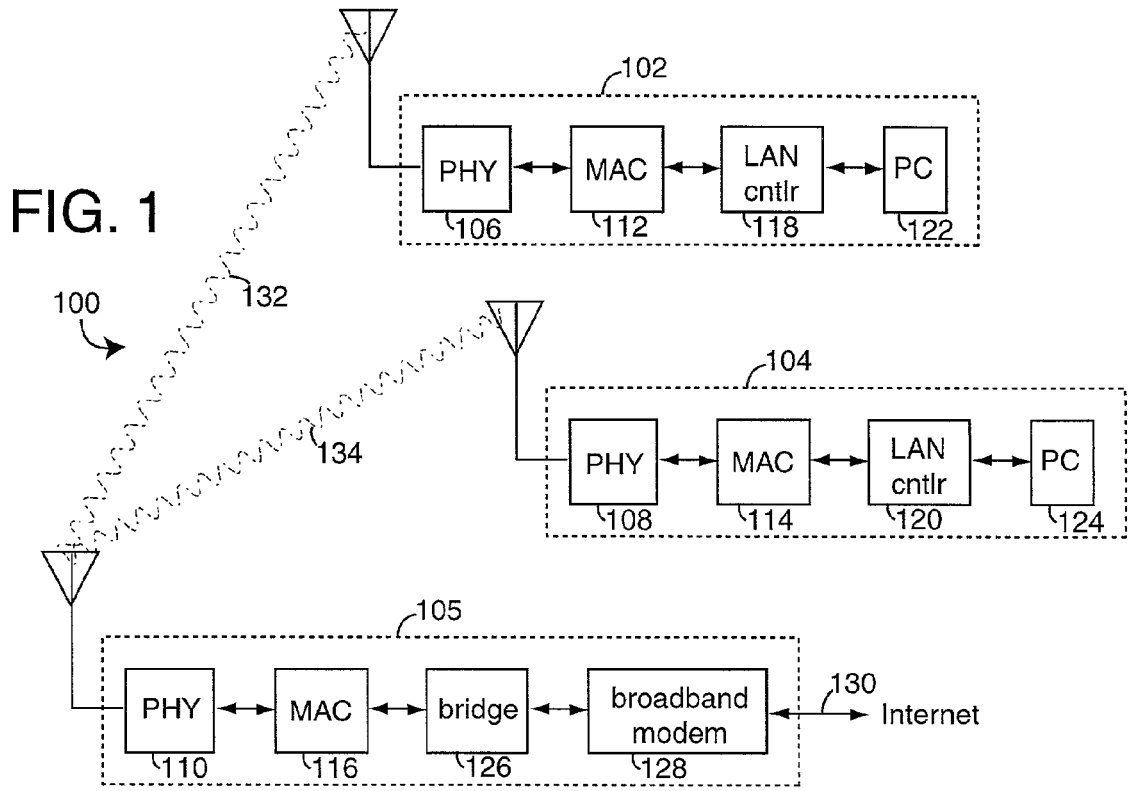
FIG. 1 is a functional block diagram of a wireless communication system embodiment of the present invention.

FIG. 1 diagrams a wireless computer data network embodiment of the present invention, and is referred to herein by the general reference numeral 100. The network 100 comprises a plurality of mobile, wireless appliances represented by units 102 and 104, and at least one base station connected to the Internet, e.g., represented here by a base station 105. Network 200 preferably operates according to industry networking standards. For example, the IEEE-802 standard defines protocols for two types of networks, ad-hoc and client/server networks. An ad-hoc network is a simple network where communications are established between multiple stations in a given coverage area without the use of an access point or server. Such standard specifies the etiquette that each station must observe so that they all have fair access to the wireless medium, and provides methods for arbitrating requests to use the medium to ensure that throughput is maximized for all of the users in the base service set. The client/server network, e.g., in PCF (Point Control Function) mode, uses an access point for allocating the transmit time for all stations and it allows mobile stations to roam from cell to cell. The access point is used to handle traffic from the mobile radio to the wired or wireless backbone of the client/server network. This arrangement allows for point coordination of all of the stations in the basic service area and ensures proper handling of the data traffic. The access point routes data between the stations and other wireless stations or to and from the network server. Typically wireless local area networks (WLAN's) controlled by a central access point will provide better throughput performance.

The license-free national information structure (U-NII) radio spectrum bands in the United States are assigned to 5.15–5.25, 5.25–5.35, and 5.725–5.825 GHz, and are preferred for use in the network 100 for wireless ad-hoc LAN communication. The IEEE-802.11a protocol includes a training sequence built on a preamble that provides sufficient information to allow frequency and timing estimation as well as channel estimation to enable a receiver to lock-on to the carrier and allow data demodulation. All transmissions occur in bursts, so the receivers must find lock each time a burst commences.

A physical layer interface (PHY) 106, 108, and 110, provides the wireless interconnections. A media access controller (MAC) 112, 114, and 116, provide the next interface layer in the Open Systems Interface (OSI) seven-layer communications model. A local area network controller 188 and 120 is provided as a peripheral to a personal computer (PC) 122 and 124. These can be computer workstations and laptops that belong to employees in a business environment, and even to individuals in their homes. In one application, the base station 105 is installed in a hotel and the mobile units 102 and 104 are independent guests who have checked-in and are allowed to access the Internet as part of their room charges. Other applications include inventory control, shipment tracking, immediate-area advertising, security access, night-watchman station checking, weapons stockpile verification, etc.

A bridge 126 interfaces the local area network through a broadband modem 128 to the Internet 130. The broadband modem 128 can be implemented with DSL, ISDN, or even two-way satellite connections like Starband (www.starband.com).

A plurality of radio communications, represented by radio links 132 and 134, preferably use forty-eight active tones and four pilot tones in a 64-tone FFT coded orthogonal frequency division multiplexing (COFDM), and quadrature phase shift keying (QPSK). The modulated signals are transmitted in the five GHz frequency band. Other modes can also be used, e.g., 16 QAM and 64 QAM. Such are described in detail in the IEEE-802.11a standard (www.ieee.com).

In general, two types of receivers can be used, direct conversion and superheterodyne. Embodiments of the present invention use a double conversion superheterodyne with a first intermediate frequency of 750 MHz. The direct 770 MHz conversion type requires no image filtering, but suffers from various forms of intermodulation and varying reflections from the receiver LO leaking out the front end. A particular challenge is an extracting adequate baseband filter performance in the presence of strong adjacent interferers. Higher-order modulation schemes place very stringent requirements on the quadrature channel matching. The superheterodyne architecture suffers less, and is better used in cellular telephony and other fast fading environments.

Superheterodyne types are often criticized for their need to incorporate ceramic or SAW image filters. An image-reject mixer can be used to reduce the image filtering requirement, but they are typically limited to 30–40 dB improvements due to ideal-quadrature deviations in the two mixers. For example, an input test signal at the image frequency can be injected, and the resulting down-converted signal used for gain and phase error measurements.

A detailed discussion of the alternative receiver architectures that can be used and the challenges peculiar to this designs was written by Jacques C. Ruddell, et al., "An Integrated GSM/DECT Receiver: Design Specifications," UCB Electronics Research Laboratory Memorandum Memo #: UCB/ERL M97/82, updated 1997–1998. A copy of which is lodged in this patent application with its Information Disclosure Statement. Such information can be used to assist in implementations of embodiments of the present invention.

Figure 2:
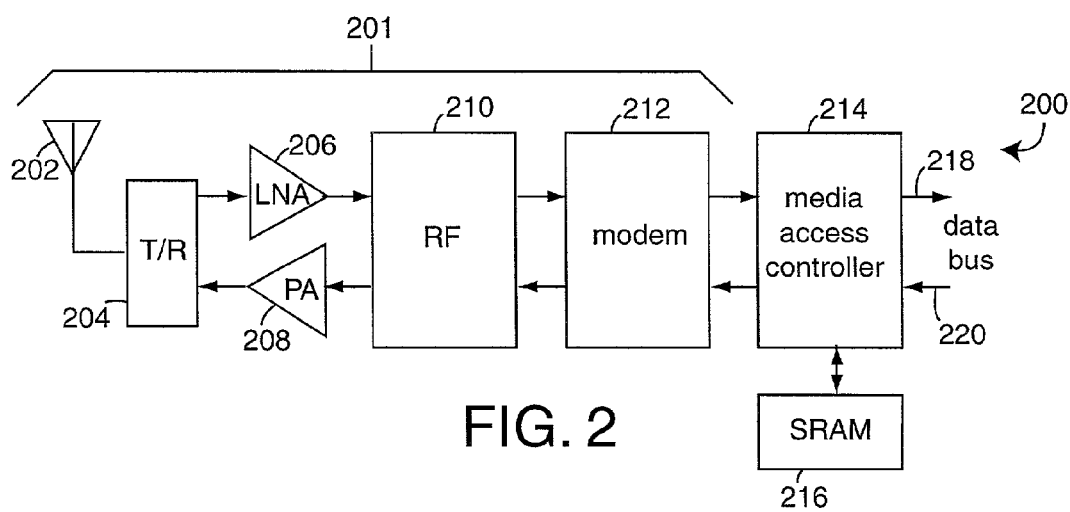
FIG. 2 is a functional block diagram of a wireless communication system embodiment of the present invention, and is similar to those units shown in FIG. 1.

FIG. 2 represents a wireless communication system embodiment of the present invention, and is referred to herein by the general reference numeral 200. The system 200 comprises, in a PCMCIA wireless LAN card embodiment, a physical layer interface (PHY) 201 that includes at least one antenna 202 for 5G Hz carrier service, a transmitter/receiver (T/R) switch 204 for half-duplex operation, a low-noise amplifier (LNA) 206, a power amplifier (PA) 208, a radio frequency (RF) transceiver, and a data modem 212. The system 200 further comprises an IEEE-802.11-compliant media access controller (MAC) 214 for layer-2 processing, and a static random access memory (SRAM) 216 for data buffering and program storage. A computer system databus is accommodated at a pair of interfaces 218 and 220, e.g., well-known industry standards PCMCIA, PCI, USB, etc. In some applications, the T/R switch 204, LNA 206, and PA 208 can be eliminated, and the RF transceiver is connected directly to antennas 202.

Antenna diversity is preferred in some applications, e.g., two transmit antennas and one receive antenna. Alternate embodiments may have two receive antennas and one transmit antenna. Diversity switching and access-point clever diversity combining will also help in signal-fading environments.

The system 200 is preferably implemented to be compatible with the IEEE-802.11a standard for wireless local area network (LAN) applications. The RF transceiver 210 and modem 212 constitute a complete wireless engine for OSI Layer-1 physical layer (PHY) functionality in broadband wireless LAN's. Supportable data rates have been tested to exceed 54 Mbits/second.

Given the present state of semiconductor technology development, the system 200 is preferably constructed on a single printed circuit board (PCB) and the RF transceiver 210 and modem 212 are each implemented with CMOS technology in individual integrated circuits. The present inventors have discovered that 0.25 micron CMOS technology is practical for use in implementations of the modem 212, and 0.18 micron CMOS technology for the RF transceiver 210. One such silicon foundry that has the capability to manufacture such parts is Taiwan Semiconductor Manufacturing Co., Ltd. Using on-chip filters and image reject mixers can reduce the filter order-number, and therefore, cost of any external filters needed. Fully differential signal paths are used to combat the unavoidably noisy environment.

Gallium Arsenide (GaAs), silicon-on-insulator (SOI), and Silicon Germanium (SiGe) semiconductor technologies could be used for such extreme high frequency circuits, but embodiments of the present invention all strictly use CMOS technology with a higher level of integration. Such CMOS-implemented embodiments may require various design features, such as on-chip differential signal connections, bias control, and attention to signal shielding, all of which are described in more detail below. Adjustable bias circuits make it possible to overcome both the process variations of a generic digital CMOS process and the variation of transistor behavior with temperature. Power management for such bias is therefore critically required. In commercial implementations of the present invention that have been built, the overall power consumption compares favorably with IEEE-802.11b devices that operate at half the carrier frequency. The Radiata (now Cisco Systems, San Jose, Calif.) R-RF5 single-chip transceiver and R-M11a single-chip modem are examples. Such chip sets can be operated within the power constraints of the PCMCIA Type-II standard. The R-RF5 is packaged in a 68-pin micro lead frame (MLF) type, and the R-M11a is packaged in a 233-pin chip array ball grid array (CABGA).

Power consumption is critically controlled so embodiments of the present invention can be used in battery-operated portable appliances, e.g., laptop computers and cellphones. CMOS technology excels at low power consumption, but not when operated at high frequencies. Operating power is therefore dynamically controlled to be distributed to the various circuits only when absolutely needed.

One embodiment of the present invention comprises only the design information necessary for a silicon foundry to implement the RF transceiver 210 and a modem 212 in CMOS technology. For example, the processor core can be supplied in synthesizable hardware description language (HDL) files. The actual functioning hardware and software for network 100 and system 200 are fabricated by the commercial customer from the purchased or licensed design information. In a business model embodiment of the present invention, these commercial customers pay royalties under patents licenses to replicate, sell, and use the hardware and software.

Figure 3:
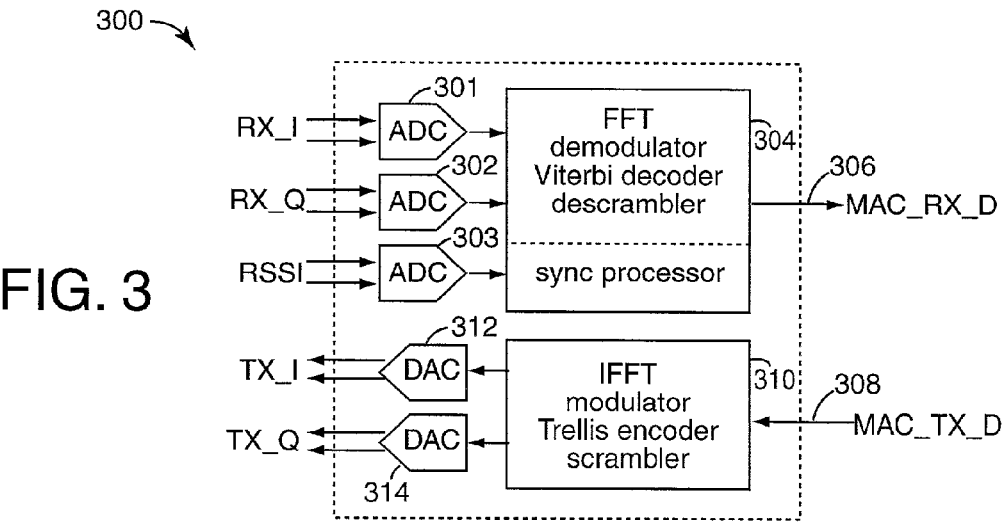
FIG. 3 is a functional block diagram of a single-chip radio transceiver embodiment of the present invention as used in the systems of FIGS. 1–2.

FIG. 3 shows a modem 300, similar to those in FIGS. 1 and 2. Modem 300 includes analog differential inputs for receiver in-phase (RX_I), receiver quadrature phase (RX_Q), and receive signal strength indication (RSSI), e.g., 0–20 MHz baseband. These inputs are respectively connected to analog-to-digital converters (ADC's) 301–303. A receive digital signal processor (DSP) 304 combines hardware and software for down-conversion, decimation filtering, frequency offset correction, synchronization, time-to-frequency transformation (FFT), demodulation, de-interleaving, Viterbi decoding, descrambling, and serial-to-parallel conversion. The results of all this processing appear at a MAC_RX_D data output 306 that connects to a media access controller (MAC) for layer-2 processing.

Conversely, a MAC_TX_D data input 308 is connected to a transmit DSP 310. Such combines DSP hardware and software to do parallel-to-serial conversion, scrambling, Trellis encoding, interleaving, modulating, amplitude and pulse shaping, inverse frequency-to-time transformation (IFFT), cycle extending, interpolation filtering, and up-conversion. A pair of digital-to-analog converters (DAC) 312 and 314 respectively provide differential signal drives TX_I and TX_Q for the radio transmitter, e.g., at 0–20 MHz baseband.

Core logic included in implementations of the modem 300 is preferably the 2.5 volt type that provides significant battery and portable-operation power savings.

Figure 4A:
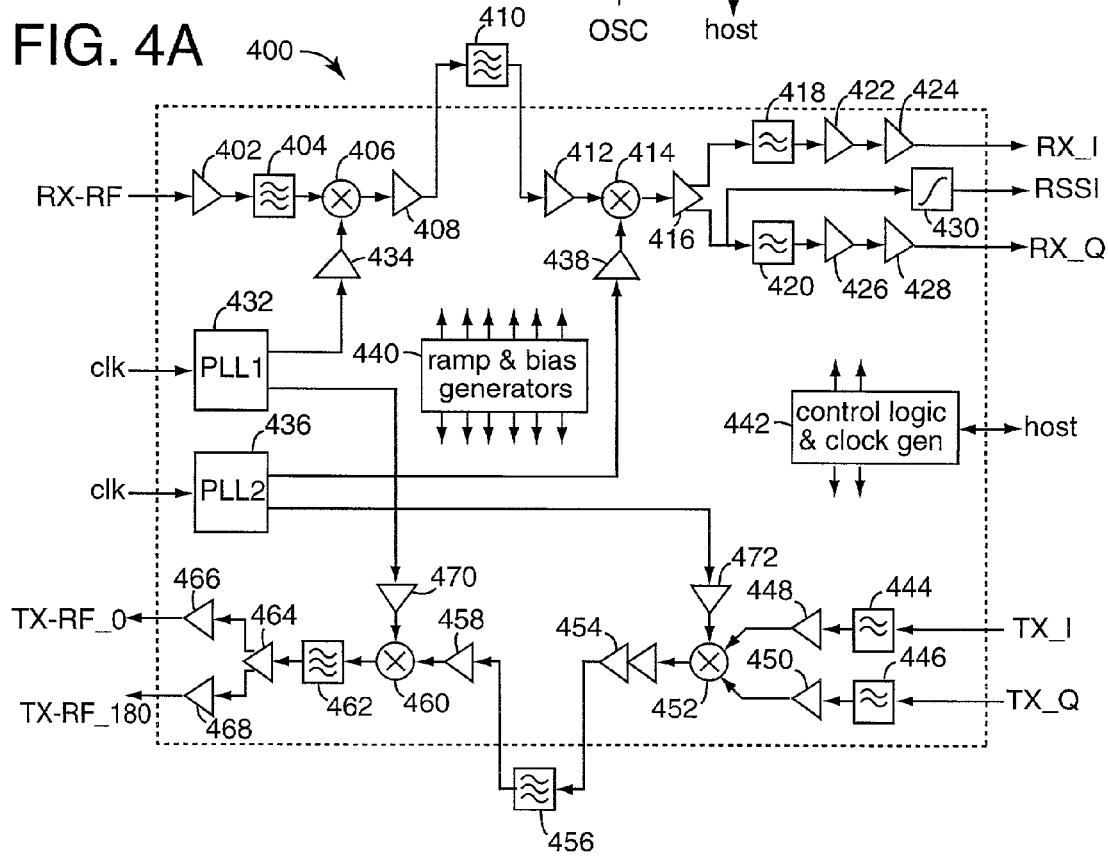
FIGS. 4A and 4B each shows a schematic diagram of a single-chip radio transceiver embodiment of the present invention as represented in FIGS. 1–3, and each shows how external intermediate frequency bandpass filters are used.

FIG. 4A illustrates one embodiment of a dual-conversion superheterodyne RF transceiver 400, similar to those shown in FIGS. 1 and 2. A receiver portion comprises an RF amplifier 402, an RF bandpass filter 404, a first receiver mixer 406, an intermediate frequency (IF) amplifier 408, an external IF bandpass filter 410, a second IF amplifier 412, a second receive image-reject mixer 414, a differential baseband amplifier 416, a low-pass filter 418 and 420, and receiver output amplifiers 422, 424, 426, and 428. In high performance applications, the external IF bandpass filter 410 may incorporate a surface acoustic wave (SAW) type. A log-detector 430 provides an RSSI output. The first receiving image-reject mixer 406 receives a local oscillator signal from a first phase lock loop (PLL1) 423 through a buffer 434. The second receive image-reject mixer 414 receives another local oscillator signal from a second phase lock loop (PLL2) 423 through a buffer 438. The IF bandpass filters 410 and 456 passed the 760–780 MHz band in one implementation that was built and worked well. Such filters may need to be surface acoustical wave (SAW) types if the application is very demanding. Otherwise, the filters can be inexpensive inductive-capacitive types since the IF frequency is relatively high.

In the second mixer of the transceiver embodiment herein, both a low-ID and an IQ (direct conversion) last stage are used. The modem embodiment herein does digital final mixing for the low-IF case. Many artisans define direct conversion as one quadrature conversion only, as used herein there can be more than one conversion. Prior art devices with relatively low-IF frequencies need image reject mixers, e.g., "low-IF architectures". Such image reject mixers actually comprise two double-balanced mixers, two 90° quadrature hybrids, and an in-phase power divider. They primarily separate the desired signal from its image, and IF SAW filters can improve this more. Image-reject mixers are most widely used where the IF frequency is very low, and the real and image frequencies are close to one another.

The programmable control of bias is important in that it allows a complicated analog RF device to be adjusted to compensate for normal processing variations from chip-to-chip, and also within a chip. Otherwise, it can be difficult to achieve a high yield where all chips or parts of a chip are working with adequate bias conditions.

Managed power (bias) is provided, as required by each portion of the transceiver, by a ramp and bias generator logic 440. Ramping the bias reduces power supply transients that can otherwise cause internal interference. Alternate embodiments may use other than a ramp function. General controls and clocks are provided by microprocessor 442. The transmitter portion receives baseband TX_I and TX_Q analog signals from a modem and remove the higher frequencies with a pair of low-pass filters 444 and 446. The filtered signals are buffered by amplifiers 448 and 450 before being applied to a single-sideband upconverter 452. An IF signal is output and buffered up by a transmitter IF amplifier 454. An external bandpass IF filter 456, such as a surface acoustic wave (SAW) type, connects back into a second IF buffer 458. A conversion to RF is made in a second transmit mixer 460. An RF bandpass filter 462 selects the desired carrier output and is split by a different driver 464. A pair of output amplifiers 466 and 468 are suitable for driving an antenna directly. The second transmit IF local oscillator drive is provided from PPL1 432 through a buffer 470. Similarly, the first transmit IF local oscillator drive is provided from PPL2 436 through another buffer 472.

The transceiver 400 preferably operates from battery power, e.g., 1.8 and 3.3 volts. Low-power operation of 170 milliamps receive and 200 milliamps transmit have been tested. Preferred implementations are such that modem 300 and transceiver 400 interface directly to one another, e.g., to save expense and space. Applications that can be accommodated by RF transceiver 400 are IEEE 802.11a COFDM wireless LANs and links, wireless Ethernet, Hiperlan I, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

The microprocessor 442 has an important role in the economic manufacture of parts that implement embodiments of the present invention. Certain production variances will occur during manufacturing, and the prior art simply culls parts that exceed tolerances and accepts the lower yield. The microprocessor 442 is programmed to detect out-of-spec operational performance and to adjust power levels and signal routing to compensate. The objective is to salvage on otherwise defective part by embedded and automatic intelligent adaptations. A built-in self-test (BIST) is therefore an important aspect of this objective.

Figure 4B:
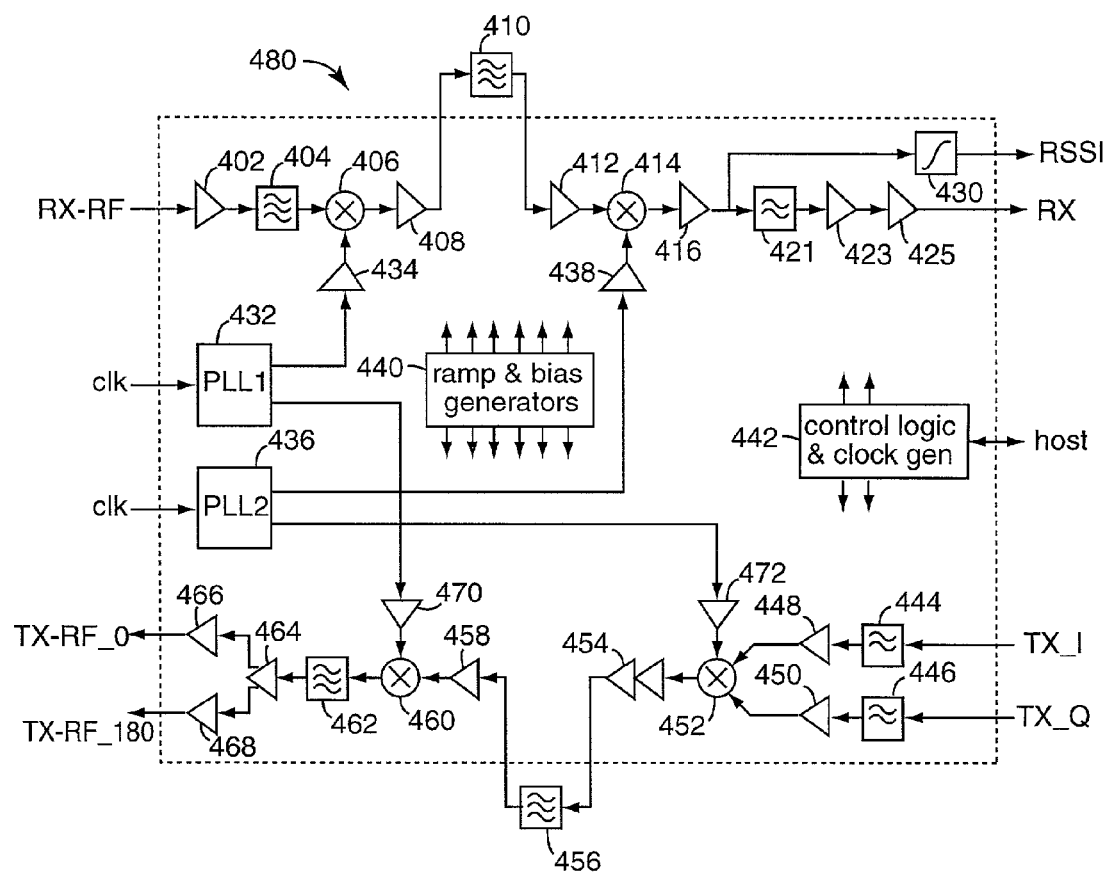

FIG. 4B illustrates another embodiment of a dual-conversion superheterodyne RF transceiver 480, similar to those shown in FIGS. 1 and 2. The difference between RF transceiver 400 of FIG. 4A and RF transceiver 480 of FIG. 4B is in the baseband sections of their receive paths. Transceiver 480 of FIG. 4B has a single baseband output, while transceiver 400 has I and Q outputs.

Embodiments of the present invention include chip-tuning means that increase production yields by actively compensating devices that have physical characteristics that would otherwise put them out-of-bounds during operation. In general, such chip tuning is accomplished by manipulating bias levels applied to various portions of the circuits.

In general, embodiments of the present invention have a distinctive frequency synthesizer architecture that can be operated as either as an offset phase locked loop (PLL) or as two independent PLL's. The offset PLL operation is used to minimize phase noise for particular oscillator frequency combinations where the mixer intermodulation products would otherwise be in-band.

The PLL's preferably produce signals that can be used to control either internal or external voltage controlled oscillators (VCO's). The charge pump and phase detector embodiments of the present invention preferably automatically adapt their control ranges to be compatible with either the low voltages used by internal VCO's, or the higher voltages required by most off-the-shelf discrete VCO's.

Embodiments of the present invention include a pass-through mode that connects an externally locked local oscillator reference frequency source directly to the frequency mixers, thus bypassing on-board oscillators and PLL's. Such mode is used in manufacturing embodiments of the present invention to reduce production testing times, and improves integrated circuit characterization. It can also be used in more demanding applications where external local oscillators or VCO's are necessary to ensure low enough phase noise.

On-chip circuits are preferably used to test the tuning range of both internal or external VCO's. The manufacturing process spread and the VCO center frequency drift-with-temperature can then be modeled and corrected with the aid of measured parameters from an on-chip temperature sensor, on modeled parameters. Alternatively, the devices are calibrated at a nominal temperature to map the resultant frequency to a combination of the coarse tuning by a capacitor bank and the continuous tuning by a varactor. If a temperature change exceeds some predetermined amount, the device is recalibrated.

A four times (4×) second local oscillator (LO) frequency for the fixed offset loop frequency provides both a source for the fixed offset loop input and a way to generate accurate differential quadrature local oscillators. The latter are needed to build image rejecting mixers and IQ downconverters that are insensitive to duty cycle variations. Embodiments of the present invention fully integrate VCO's and synthesizers in an offset loop to minimize phase noise and synthesizer settling time in IEEE-802.11a radio transceivers.

High-order modulation schemes like 64QAM are used in the highest rate transmission of the IEEE-802.11a standard. These necessitate high carrier-to-noise (C/N) ratios at the receiver analog-to-digital converter (ADC) inputs for accurate demodulation. Any phase-noise contributed by the frequency conversion oscillators must be insignificant enough to not adversely impact the overall C/N. In general, the sensitivity of IEEE-802.11a systems to local oscillator phase noise increases with the carrier offset, and is greatest at the subscriber separation, e.g., 312.5 KHz. The symbol rate is slightly different (250 KHz) because of the cyclic extension.

The prior art minimizes phase noise by using low-noise voltage controlled oscillators with phase-locked loop bandwidths much less than 312.5 KHz. Conventional systems that integrate voltage controlled oscillators typically exhibit a low quality factor (Q). So a loop bandwidth ideally greater than 312.5 KHz is needed to bring down overall phase noise, and to cope with the fast transmit-to-receive and receive-to-transmit turnaround times dictated by the IEEE-802.11a standard. The total phase noise is determined both by the "Q" of the VCO and by the total multiplication ratio used to translate the reference oscillator to the desired local oscillator frequency, e.g., 20 MHz to 4.50 GHz. In a conventional single loop frequency synthesizer the multiplication ratio is minimized by selecting the reference frequency to be as high as possible. This maximum reference frequency is limited, however, by both the frequency step size required for different channel selections and the fixed division ratio of a prescaler that might precede the adjustable divider in the loop.

Embodiments of the present invention minimize such total multiplication ratio with an offset loop. The controlled reference frequency ("R") signal from the VDCO is mixed with another fixed-frequency ("F") oscillator of substantially lower phase noise. Then the lower sideband is selected at the output by filtering. The overall division ratio is reduced by F/R. For example, if the desired oscillator frequency is 4.50 GHz and the reference frequency is 5.0 MHz, then the total division ratio in a conventional loop is 900. If a the offset loop uses a fixed oscillator of 3 GHz then the lower sideband output is 1.50 GHz and the division ratio now required is reduced to 300. As seen in FIG. 4, the fixed oscillator in the offset loop is available from the second local oscillator in the conversion chain.

Integrated VCO tuning elements typically include non-linear control voltage-frequency tuning characteristics. The loop dynamics are not linear, and change with the control-voltage levels. Control voltage variations can be caused by VCO center frequency drift with temperature, or by changing the channel frequency. If the oscillator phase noise is close to the maximum that can be tolerated at optimal loop dynamics settings, non-linearities can push past unacceptable limits.

Embodiments of the present invention compensate non-linear behavior by making the charge-pump current programmable over a wide range, e.g., by switching a capacitor bank in parallel with a variable tuning component. On-chip frequency and temperature measurements are then used by an intelligent controller to program the charge-pump currents.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A wireless computer data network, comprising:
   a plurality of mobile, wireless appliances;
   at least one base station connected to the Internet; and
   an interface circuit for establishing an ad-hoc radio communication link amongst the plurality of mobile, wireless appliances and the base station;
   wherein, the interface circuit operates with carrier frequencies in the 5 GHz band and data is transferred with orthogonal frequency division multiplexing (OFDM), and wherein each of the plurality of mobile, wireless appliances comprises:
   a single integrated circuit that implements a complete radio transceiver for wireless connection with the interface circuit, wherein said single integrated circuit comprises:
   at least two independent frequency synthesizers connected in a double-conversion superheterodyne configuration.

2. A wireless computer data network, comprising:
   a plurality of mobile, wireless appliances;
   at least one base station connected to the Internet; and
   an interface circuit for establishing an ad-hoc radio communication link amongst the plurality of mobile, wireless appliances and the base station;
   wherein, the interface circuit operates with carrier frequencies in the 5 GHz band and data is transferred with orthogonal frequency division multiplexing (OFDM), and wherein each of the plurality of mobile, wireless appliances comprises:
   a single integrated circuit that implements a complete ratio transceiver for wireless connection with the interface circuit, wherein said single integrated circuit comprises:
   a pair of on-chip synthesizers that each have a voltage-controlled oscillator and phase-locked loop that can be operated independently for each conversion stage, or operated in offset mode; and an input for bypassing the on-chip synthesizers and to inject external reference frequencies during voltage-controlled oscillator and phase-locked loop testing, chip characterization, and automatic compensation modeling.

3. A wireless computer data network that includes a plurality of untethered mobile units that provide for ad-hoc data connections with an Internet-connected base station using the IEEE-802.11a standard;
wherein, each mobile unit and base station includes a radio transceiver fully integrated on a single semiconductor chip with a double-conversion superheterodyne type receiver portion and a two-stage up-conversion transmitter that shares the same intermediate and local oscillator frequencies;
wherein, a pair of on-chip synthesizers are included that each have a voltage-controlled oscillator and phase-locked loop that can be operated independently for each conversion stage, or operated in offset mode; and
wherein, an input is provided for injecting external reference frequencies during voltage-controlled oscillator and phase-locked loop testing, chip characterization, and automatic compensation modeling.

4. A single-chip radio transceiver for operation in the 5 GHz radio spectrum, comprising:
a double-conversion superheterodyne radio receiver;
a two-stage up-conversion radio transmitter;
a first frequency synthesizer connected to supply a higher local oscillator reference frequency to both the receiver and transmitter;
a second frequency synthesizer independent of the first frequency synthesizer, and connected to supply a lower local oscillator reference frequency to both the receiver and transmitter;
a plurality of ramp and bias generators for selectively and gradually applying operating power to various parts of the receiver, transmitter, and the first and second frequency synthesizers; and
a microcomputer connected to monitor and control each of the plurality of ramp and bias generators, receiver, transmitter, and the first and second frequency synthesizers.

5. The single-chip radio transceiver of claim 4, wherein: the microcomputer compensates for manufacturing production variations by adjustments output to the plurality of ramp and bias generators.

6. The single-chip radio transceiver of claim 4, wherein: the microcomputer compensates for temperature variations according to device characteristic models.

7. The single-chip radio transceiver of claim 4, further comprising:
an input port provided for injecting an external reference frequency during voltage-controlled oscillator and phase-locked loop testing, chip characterization, and automatic compensation modeling;
wherein, the microcomputer thereafter compensates during device operation for production and temperature variations.

8. A wireless computer data network, comprising:
a wireless appliance means for mobile roaming within reach of an ad-hoc wireless communication link;
at least one base station means for connecting the wireless appliance means through to the Internet over said ad-hoc wireless communication link; and
an interface means for establishing said ad-hoc radio communication link, and for operating with carrier frequencies in the 5 GHz band, and for transferring orthogonal frequency division multiplexing (OFDM) data,
wherein each of the wireless appliance means comprises:
a single integrated circuit means for implementing a single radio transceiver portion of the interface means, wherein said single integrated circuit means comprises:
at least two independent frequency synthesizers means for connection in a double-conversion superheterodyne configuration.

9. A wireless computer data network, comprising:
a wireless appliance means for mobile roaming within reach of an ad-hoc wireless communication link;
at least one base station means for connecting the wireless appliance means through to the Internet over said ad-hoc wireless communication link; and
an interface means for establishing said ad-hoc radio communication link, and for operating with carrier frequencies in the 5 GHz band, and for transferring orthogonal frequency division multiplexing (OFDM) data,
wherein each of the wireless appliance means comprises:
a single integrated circuit means for implementing a single radio transceiver portion of the interface means, wherein said single integrated circuit means comprises:
a pair of on-chip synthesizer means for voltage-controlled oscillator and phase-locked loop functions that can be operated independently for each conversion stage, or operated in offset mode; and
an input means for bypassing the on-chip synthesizers and to inject external reference frequencies during voltage-controlled oscillator and phase-locked loop testing, chip characterization, and automatic compensation modeling.

10. A method of operating a wireless computer data network that includes a plurality of untethered mobile units that provide for ad-hoc data connections with an Internet-connected base station using the IEEE-802.11a standard, the method comprising the steps of;
completely integrating a radio transceiver in each mobile unit and base station on a single semiconductor chip with a double-conversion superheterodyne type receiver portion and a two-stage up-conversion transmitter that shares the same intermediate and local oscillator frequencies;
including a pair of on-chip synthesizers on said chip that each have a voltage-controlled oscillator and phase-locked loop that can be operated independently for each conversion stage, or operated in offset mode; and
providing an input for injecting external reference frequencies during voltage-controlled oscillator and phase-locked loop testing, chip characterization, and automatic compensation modeling.

11. A single-chip radio transceiver for operation in the 5 GHz radio spectrum, comprising:
means for a double-conversion superheterodyne radio reception;
means for a two-stage up-conversion radio transmission;
means for synthesizing and connecting a first frequency synthesizer to supply a higher local oscillator reference frequency to both the reception and transmission means;
means for connecting a second frequency synthesizer independent of the first frequency synthesizer, and for connecting to supply a lower local oscillator reference frequency to both the receiver and transmitter of the transceiver;

ramp and bias generator means for selectively and gradually applying operating power to various parts of the receiver, transmitter, and the first and second frequency synthesizers; and microcomputer means for monitoring and controlling ramp and bias generator means, the reception and transmission means, and said first and second frequency synthesizers.

12. The single-chip radio transceiver of claim 11, wherein:

the microcomputer means includes means for compensating any manufacturing production variations by adjusting an output provided to the ramp and bias-generator means.

13. The single-chip radio transceiver of claim 11, wherein:

the microcomputer means compensates for temperature variations according to device characteristic models.

14. The single-chip radio transceiver of claim 11, further comprising:

an input means for injecting an external reference frequency during voltage-controlled oscillator and phase-locked loop testing, chip characterization, and automatic compensation modeling;

wherein, the microcomputer means thereafter compensates during device operation for production and temperatue variations.

* * * * *

UNITED STATES PATENT AND TRADEMARK OFFICE
CERTIFICATE OF CORRECTION

PATENT NO.     : 6,944,121 B1
DATED          : September 13, 2005
INVENTOR(S)    : Weste et al.

It is certified that error appears in the above-identified patent and that said Letters Patent is hereby corrected as shown below:

Column 2,
Line 18, change "the higher data rate" to -- the highest date rate --.
Line 39, change "driving local oscillator" to -- driving a local oscillator --.

Column 4,
Line 42, change "network controller 188" to -- network controller 118 --.

Column 5,
Line 8, change "an extracting" to -- in extracting --.
Lines 37-38, change "a transmitter/receiver" to -- a transmit/receive --.

Column 6,
Lines 9-10, change "noisy environment." to -- noisy digital environment. --.

Column 7,
Lines 25-26, change "first receiving" to -- first receive --.
Line 30, change "(PLL2) 423" to -- (PLL2) 436 --.

Column 8,
Line 1, change "transmitter IF" to -- transmit IF --.
Line 6, change "different driver" to -- differential driver --.
Line 36, change "on otherwise" to -- an otherwise --.

Column 9,
Line 14, change "on modeled parameters." to -- or modeled parameters. --.
Line 38, change "subscriber" to -- subcarrier --.
Line 62, change "VDCO" to -- VCO --.

UNITED STATES PATENT AND TRADEMARK OFFICE
CERTIFICATE OF CORRECTION

PATENT NO. : 6,944,121 B1
DATED : September 13, 2005
INVENTOR(S) : Weste et al.

It is certified that error appears in the above-identified patent and that said Letters Patent is hereby corrected as shown below:

Column 10,
Line 61, change "ratio" to -- radio --.

Column 11,
Line 52, delete the word "port".

Column 14,
Lines 12-13, change "temperatue" to -- temperature --.

Signed and Sealed this

Fifteenth Day of November, 2005

JON W. DUDAS
*Director of the United States Patent and Trademark Office*